(12) United States Patent
Hammad et al.

(10) Patent No.: US 12,000,056 B2
(45) Date of Patent: Jun. 4, 2024

(54) TANDEM ELECTROLYSIS CELL

(71) Applicant: SAUDI ARABIAN OIL COMPANY, Dhahran (SA)

(72) Inventors: Ahmad D. Hammad, Dhahran (SA); Bandar A. Fadhel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 653 days.

(21) Appl. No.: 16/933,790

(22) Filed: Jul. 20, 2020

(65) Prior Publication Data

US 2021/0395903 A1  Dec. 23, 2021

(30) Foreign Application Priority Data

Jun. 18, 2020 (GR) ............................... 20200100345

(51) Int. Cl.
*C25B 1/46* (2006.01)
*B01D 53/26* (2006.01)
(Continued)

(52) U.S. Cl.
CPC .............. *C25B 1/46* (2013.01); *B01D 53/265* (2013.01); *C25B 9/23* (2021.01); *C25B 9/65* (2021.01);
(Continued)

(58) Field of Classification Search
CPC .... C25B 1/34; C25B 1/46; C25B 1/04; C25B 9/23; C25B 9/65; C25B 9/70;
(Continued)

(56) References Cited

U.S. PATENT DOCUMENTS

| 106,836 A | 8/1870 | Kuhlmann |
| 665,346 A | 1/1901 | Reed |

(Continued)

FOREIGN PATENT DOCUMENTS

| CA | 2938299 | | 5/2015 |
| CN | 107059013 A | * | 8/2017 |

(Continued)

OTHER PUBLICATIONS

"Hydrogen and Oxygen production via electrolysis powered by renewable energies to reduc environmental footprint of a WWTP," Greenlysis, www.life-greenlysis.eu 2010-2012, 16 pages.

(Continued)

*Primary Examiner* — Luan V Van
*Assistant Examiner* — Mofoluwaso S Jebutu
(74) *Attorney, Agent, or Firm* — Fish & Richardson P.C.

(57) ABSTRACT

A system and methods for electrolysis of saline solutions are provided. An exemplary system provides a tandem electrolysis cell. The tandem electrolysis cell includes a common enclosure that has two chambers. A first chamber is separated from a second chamber by a cation selective membrane. A common anode and a first cathode (cathode A) are disposed in the first chamber. The first cathode and the common anode are configured to electrolyze a saline solution to hydrogen and oxygen. A second cathode (cathode B) is disposed in the second chamber. The second cathode and the common anode are configured to electrolyze a brine solution in the first chamber to form chlorine and water in the second chamber to form hydrogen and hydroxide ions.

27 Claims, 7 Drawing Sheets

(51) Int. Cl.
*C25B 9/23* (2021.01)
*C25B 9/65* (2021.01)
*C25B 15/02* (2021.01)
*C25B 15/08* (2006.01)
*E03B 3/28* (2006.01)
*H02S 40/38* (2014.01)
*H02S 40/42* (2014.01)

(52) U.S. Cl.
CPC .............. *C25B 15/02* (2013.01); *C25B 15/08* (2013.01); *E03B 3/28* (2013.01); *H02S 40/38* (2014.12); *H02S 40/425* (2014.12)

(58) Field of Classification Search
CPC ......... C25B 13/08; C25B 15/02; C25B 15/08; C25B 15/025; C25B 15/029; C25B 15/031; C25B 1/26
See application file for complete search history.

(56) References Cited

U.S. PATENT DOCUMENTS

| | | | |
|---|---|---|---|
| 701,987 A | 6/1902 | Alz | |
| 978,576 A | 12/1910 | Goodell | |
| 2,378,905 A | 6/1945 | Bates | |
| 2,614,066 A | 10/1952 | Cornell | |
| 2,910,426 A | 10/1959 | Gluesenkamp | |
| 3,288,692 A | 11/1966 | Leduc | |
| 3,409,540 A | 11/1968 | Gould et al. | |
| 3,427,235 A | 2/1969 | Leduc | |
| 3,527,834 A | 9/1970 | Kehl et al. | |
| 3,533,938 A | 10/1970 | Arnold | |
| 3,585,217 A | 6/1971 | Titzenthaler | |
| 3,632,497 A | 1/1972 | Leduc | |
| 3,702,292 A | 11/1972 | Burich | |
| 3,726,789 A | 4/1973 | Kovach | |
| 3,755,143 A | 8/1973 | Hosoi et al. | |
| 3,856,659 A | 12/1974 | Owen | |
| 3,894,059 A | 7/1975 | Selvaratnam | |
| 4,064,062 A | 12/1977 | Yurko | |
| 4,090,949 A | 5/1978 | Owen et al. | |
| 4,119,507 A | 10/1978 | Simmrock et al. | |
| 4,134,824 A | 1/1979 | Kamm et al. | |
| 4,230,551 A | 10/1980 | Salyer et al. | |
| 4,264,435 A | 4/1981 | Read et al. | |
| 4,297,203 A | 10/1981 | Ford et al. | |
| 4,310,501 A | 1/1982 | Reh et al. | |
| 4,329,215 A * | 5/1982 | Scoville ................... | C25B 1/26 204/266 |
| 4,332,663 A | 6/1982 | Berneke | |
| 4,426,276 A | 1/1984 | Dean et al. | |
| 4,434,031 A | 2/1984 | Horowitz et al. | |
| 4,522,802 A | 6/1985 | Setzer et al. | |
| 4,527,003 A | 7/1985 | Okamoto et al. | |
| 4,560,451 A | 12/1985 | Nielsen | |
| 4,587,011 A | 5/1986 | Okamoto et al. | |
| 4,602,986 A | 7/1986 | Ellis et al. | |
| 4,655,904 A | 4/1987 | Okamoto et al. | |
| 4,725,349 A | 2/1988 | Okamoto et al. | |
| 4,735,728 A | 4/1988 | Wemhoff | |
| 4,761,394 A | 8/1988 | Lauritzen | |
| 4,786,400 A | 11/1988 | Farnsworth | |
| 4,830,728 A | 5/1989 | Herbat et al. | |
| 4,992,160 A | 2/1991 | Long et al. | |
| 5,012,360 A | 4/1991 | Yamauchi et al. | |
| 5,091,351 A | 2/1992 | Murakawa et al. | |
| 5,108,581 A | 4/1992 | Aldridge | |
| 5,527,436 A | 6/1996 | Cooker et al. | |
| 5,601,937 A | 2/1997 | Isenberg | |
| 5,624,493 A | 4/1997 | Wagh et al. | |
| 5,904,837 A | 5/1999 | Fujiyama | |
| 5,906,728 A | 5/1999 | Iaccino et al. | |
| 5,951,850 A | 9/1999 | Ino et al. | |
| 5,954,935 A | 9/1999 | Neumeister et al. | |
| 6,033,555 A | 3/2000 | Chen et al. | |
| 6,190,533 B1 | 2/2001 | Bradow et al. | |
| 6,210,562 B1 | 4/2001 | Xie et al. | |
| 6,280,593 B1 | 8/2001 | Wiese et al. | |
| 6,293,979 B1 | 9/2001 | Choudhary et al. | |
| 6,312,658 B1 | 11/2001 | Hufton et al. | |
| 6,319,864 B1 | 11/2001 | Hannigan et al. | |
| 6,336,791 B1 | 1/2002 | O'Toole | |
| 6,531,515 B2 | 3/2003 | Moore, Jr. et al. | |
| 6,656,346 B2 | 12/2003 | Ino et al. | |
| 6,743,961 B2 | 6/2004 | Powers | |
| 6,849,356 B2 | 2/2005 | Dow et al. | |
| 6,979,757 B2 | 12/2005 | Powers | |
| 7,019,187 B2 | 3/2006 | Powers | |
| 7,045,554 B2 | 5/2006 | Raje et al. | |
| 7,132,042 B2 | 11/2006 | Genetti et al. | |
| 7,302,795 B2 | 12/2007 | Vetrovec | |
| 7,374,664 B2 | 5/2008 | Powers | |
| 7,378,561 B2 | 5/2008 | Olah et al. | |
| 7,396,449 B2 | 7/2008 | Powers | |
| 7,404,889 B1 | 7/2008 | Powers | |
| 7,419,584 B2 | 9/2008 | Stell et al. | |
| 7,460,333 B2 | 12/2008 | Akamatsu et al. | |
| 7,550,642 B2 | 6/2009 | Powers | |
| 7,592,290 B2 | 9/2009 | Hussain et al. | |
| 7,642,292 B2 | 1/2010 | Severinsky | |
| 7,744,747 B2 | 6/2010 | Halsey | |
| 7,858,834 B2 | 12/2010 | Powers | |
| 7,906,559 B2 | 3/2011 | Ohlah et al. | |
| 7,972,498 B2 | 7/2011 | Buchanan et al. | |
| 7,973,087 B2 | 7/2011 | Kibby et al. | |
| 8,152,973 B2 | 4/2012 | Yamamoto et al. | |
| 8,198,338 B2 | 6/2012 | Shulenberger et al. | |
| 8,287,716 B2 | 10/2012 | Al-Sadah | |
| 8,303,917 B2 | 11/2012 | Miyashiro et al. | |
| 8,304,567 B2 | 11/2012 | Kadota et al. | |
| 8,628,668 B2 | 1/2014 | Simonson | |
| 8,816,137 B2 | 8/2014 | Ohlah et al. | |
| 8,845,940 B2 | 9/2014 | Niven et al. | |
| 8,951,333 B2 | 2/2015 | Cabourdin et al. | |
| 9,085,497 B2 | 7/2015 | Jennings | |
| 9,090,543 B2 | 7/2015 | Schoedel et al. | |
| 9,096,806 B2 | 8/2015 | Abba et al. | |
| 9,175,409 B2 | 11/2015 | Sivasankar et al. | |
| 9,221,027 B2 | 12/2015 | Kuppler et al. | |
| 9,242,230 B2 | 1/2016 | Moon et al. | |
| 9,255,230 B2 | 2/2016 | Shafi et al. | |
| 9,260,366 B2 | 2/2016 | Verhaak et al. | |
| 9,279,088 B2 | 3/2016 | Shafi et al. | |
| 9,284,497 B2 | 3/2016 | Bourane et al. | |
| 9,284,502 B2 | 3/2016 | Bourane et al. | |
| 9,296,961 B2 | 3/2016 | Shafi et al. | |
| 9,303,323 B2 | 4/2016 | DiMascio et al. | |
| 9,312,454 B2 | 4/2016 | Itoh et al. | |
| 9,328,035 B1 | 5/2016 | Kuhn et al. | |
| 9,435,404 B2 | 9/2016 | Goleski et al. | |
| 9,555,367 B2 | 1/2017 | Masel et al. | |
| 9,559,375 B2 | 1/2017 | Savinell et al. | |
| 9,618,264 B1 | 4/2017 | Berdut-Teruel | |
| 9,634,343 B2 | 4/2017 | Munier et al. | |
| 9,675,979 B2 | 6/2017 | Hassell | |
| 9,752,080 B2 | 9/2017 | Christensen et al. | |
| 9,884,313 B2 | 2/2018 | Shen et al. | |
| 9,963,392 B2 | 5/2018 | Deo et al. | |
| 9,970,804 B2 | 5/2018 | Khousa et al. | |
| 9,973,141 B2 | 5/2018 | Hammad et al. | |
| 10,179,733 B2 | 1/2019 | Becker et al. | |
| 10,252,243 B2 | 4/2019 | Fadhel et al. | |
| 10,252,909 B2 | 4/2019 | Lofberg et al. | |
| 10,329,676 B2 | 6/2019 | Kaczur et al. | |
| 10,357,759 B2 | 7/2019 | D'Souza et al. | |
| 10,422,754 B2 | 9/2019 | Al Hosani et al. | |
| 2004/0129577 A1 * | 7/2004 | Bunn ....................... | C25B 1/30 204/252 |
| 2005/0211603 A1 | 9/2005 | Guillaume et al. | |
| 2006/0171065 A1 | 8/2006 | Akamatsu et al. | |
| 2007/0051633 A1 * | 3/2007 | Meyer ....................... | C25B 9/00 205/108 |
| 2007/0138020 A1 * | 6/2007 | Balagopal ................. | C25B 1/26 205/500 |

(56) References Cited

U.S. PATENT DOCUMENTS

| | | | |
|---|---|---|---|
| 2008/0011644 A1 | 1/2008 | Dean | |
| 2008/0011645 A1 | 1/2008 | Dean | |
| 2008/0083648 A1 | 4/2008 | Bishop et al. | |
| 2008/0194900 A1 | 8/2008 | Bhirud | |
| 2008/0277314 A1 | 11/2008 | Halsey | |
| 2008/0283445 A1 | 11/2008 | Powers | |
| 2009/0050523 A1 | 2/2009 | Halsey | |
| 2010/0089795 A1 | 4/2010 | Fujiyama et al. | |
| 2010/0137458 A1 | 6/2010 | Erling | |
| 2011/0083996 A1 | 4/2011 | Shafi et al. | |
| 2011/0132770 A1 | 6/2011 | Sala et al. | |
| 2011/0189302 A1* | 8/2011 | Van Niekerk | C02F 1/4618 204/229.8 |
| 2011/0247500 A1 | 10/2011 | Akhras et al. | |
| 2012/0085658 A1* | 4/2012 | Bhavaraju | C25B 15/08 204/252 |
| 2012/0292196 A1 | 11/2012 | Albrecht et al. | |
| 2013/0129610 A1 | 5/2013 | Kale | |
| 2013/0220884 A1 | 8/2013 | Bourane et al. | |
| 2013/0233766 A1 | 9/2013 | Shafi et al. | |
| 2013/0248419 A1 | 9/2013 | Abba | |
| 2014/0124377 A1* | 5/2014 | Joynt | C25B 1/26 205/335 |
| 2014/0131217 A1* | 5/2014 | Buschmann | C01B 11/062 205/633 |
| 2014/0202871 A1* | 7/2014 | Lumetta | C02F 1/4674 204/263 |
| 2015/0225295 A1 | 8/2015 | Mcandlish et al. | |
| 2015/0337445 A1 | 11/2015 | Hasegawa et al. | |
| 2015/0343416 A1 | 12/2015 | Fadhel et al. | |
| 2016/0002035 A1 | 1/2016 | Ralston et al. | |
| 2016/0264886 A1 | 9/2016 | Davydov | |
| 2016/0312369 A1 | 10/2016 | Moussallem et al. | |
| 2016/0333487 A1 | 11/2016 | Rodriguez | |
| 2017/0050845 A1 | 2/2017 | Lofberg et al. | |
| 2017/0292197 A1 | 10/2017 | Lei et al. | |
| 2019/0194074 A1 | 6/2019 | Amr et al. | |
| 2020/0263310 A1* | 8/2020 | Ua Cearnaigh | C25C 7/00 |
| 2021/0221753 A1* | 7/2021 | Gillespie | B01D 53/04 |

FOREIGN PATENT DOCUMENTS

| | | | | |
|---|---|---|---|---|
| CN | 104923234 | | 12/2017 | |
| CN | 106591875 | | 3/2019 | |
| EP | 0389294 | | 9/1990 | |
| WO | WO 2000009633 | | 2/2000 | |
| WO | WO 2009073436 | | 6/2009 | |
| WO | WO 2010009077 | | 1/2010 | |
| WO | WO 2010009082 | | 1/2010 | |
| WO | WO 2010009089 | | 1/2010 | |
| WO | WO 2010143783 | | 12/2010 | |
| WO | WO 2015128045 | | 9/2013 | |
| WO | WO-2014124444 A2 * | 8/2014 | | C25B 1/006 |
| WO | WO 2014160168 | | 10/2014 | |
| WO | WO 2015183200 | | 12/2015 | |
| WO | WO-2016193738 A1 * | 12/2016 | | |
| WO | WO 2016207892 | | 12/2016 | |
| WO | WO 2019112555 | | 6/2019 | |

OTHER PUBLICATIONS

Albrecht et al., "Unexpectedly efficient CO2 hydrogenation to higher hydrocarbons over non-doped Fe2O3," Appl. Catal., B, May 2017, 204: 119-126.

Bhuiyan, "Metathesis of Butene to Produce Propylene over Mesoporous Tungsten Oxide Catalyst: Synthesis, Characterization and Kinetic Modeling," Master thesis, King Fahd University of Petroleum and Minerals, Jun. 2013, 188 pages.

Chew et al., "Effect of nitrogen doping on the reducibility, activity and selectivity of carbon nanotube-supported iron catalysts applied in CO2 hydrogenation," Appl. Catal., A, Jul. 2014, 482: 163-170.

Choi et al., "Carbon dioxide Fischer-Tropsch synthesis: A new path to carbon-neutral fuels," Appl. Catal., B, Mar. 2017, 202: 605-610.

Choi et al., "Hydrogenation of carbon dioxide over alumina supported Fe—K catalysts," Catalysis Letters, Mar. 1996, 40: 115-118.

Cowie et al., "Naturally occurring radioactive material and naturally occurring mercury assessment of black powder in sales gas pipelines," Radiation Protection and Environment, vol. 42, Issue 1 & 2, Jan.-Mar. & Apr.- Jun. 2019, 6 pages.

Crammer et al., "The Mechanism of Isomerization of Olefins with transition metal catalysts," Journal of the American Chemical Society, Mar. 1966, 88(15): 3534-3544.

Dinesh et al., "Iron-based flow batteries to store renewable energies," Environmental Chemistry Letters, Feb. 2018, 12 pages.

Ding et al., "CO2 Hydrogenation to Hydrocarbons over Iron-Based Catalyst: Effects of Physico-Chemical Properties of Al2O3 Supports," Ind. Eng. Chem. Res., 2014, 53(45): 17563-17569.

Du et al., "Sodium Hydroxide Production from Seawater Desalination Brine: Process Design and Energy Efficency, " Environ.Sci. Technol. 52, 5949-5958, 2018, 10 pages.

Godoy et al., "210Pb content in natural gas pipeline residues ("black-powder") and its correlation with the chemical composition," Journal of Environmental Radioactivity 83 (2005) 101e111, 12 pages.

Gräfe et al., "Bauxite residue issues: IV. Old obstacles and new pathways for in situ residue bioremediation," Hydrometallurgy, 2011, 108: 46-59.

Hu et al., "Hydrothermally stable MOFs for CO2 hydrogenation over iron-based catalyst to light olefins," J. CO2 Util., 2016, 15, 89-95.

Hua et al., "Transformation of 2-Butene into Propene on WO3/MCM-48: Metathesis and Isomerization of n-Butene," Catalysts, 2018, 8, 11 pages.

Lee et al., "Selective Positional Isomerization of 2-Butene over Alumina and La-promoted Alumina Catalysts," J. Ind. Eng. Chem., Dec. 2007, 13(7): 1062-1066.

Liu et al. "Fe-MOF-derived highly active catalysts for carbon dioxide hydrogenation to valuable hydrocarbons," J. CO2 Util., Oct. 2017, 21:100-107.

Liu et al., "Pyrolyzing ZIF-8 to N-doped porous carbon facilitated by iron and potassium for CO2 hydrogenation to value-added hydrocarbons," J. CO2 Util., May 2018, 25: 120-127.

Madadkhani, "Red mud as an Ironbased Catalyst for Catalytic Cracking of Naphthalene," Master's thesis, The University of British Columbia, 2014; Shiva Makadani, The University of British Columbia, Dec. 2016, 192 pages.

Morrison, "Cis-trans Isomerization of Olefins by Intramolecular Energy Transfer," Journal of the American Chemical Society, Feb. 1965, 87(4): 932.

Naik et al. "Carbon Dioxide sequestration in cementitious products," Report No. CNU-2009-02, REP-640, Collegef Engineering, University of Wisconsin-Milwaukee, Jan. 2009 53 pages.

Nam et al., "Catalytic conversion of carbon dioxide into hydrocarbons over iron supported on alkali ion-exchanged Y-zeolite catalysts," Appl. Catal., A, Apr. 1999, 179(1-2): 155-163.

Nam et al., "Catalytic Conversion of Carbon dioxide into hyrdrocarbons over zinc promoted iron catalysts," Energy onvers. Manage., 1997, 38: S397-S402.

Ndlela et al., "Reducibility of Potassium-Promoted Iron Oxide under Hydrogen Conditions," Ind. Eng. Chem. Res., 2003, 42: 2112-2121.

Numpilai et al., "Pore size effects on physicochemical properties of Fe—Co/K—Al2O3 catalysts and their catalytic activity in CO2 hydrogenation to light olefins," Appl. Surf. Sci., Jul. 2019, 483, 581-592.

Pall.com (online), "Cyclo-Filter System," retrieved from URL <https://www.pall.com/en/oil-gas/midstream/midstream-black-powder.html>, retrieved on Jun. 16, 2020, available on or before 2020, 4 pages.

Pavlov et al., "Processes of Synthesis of 1-Butene from 2-Butene by the Positional Isomerization on Sulfocation Exchangers," Russian Journal of Applied Chemistry, Jul. 2009, 82(6): 1117-1122.

Ramirez et al., "Metal Organic Framework-Derived Iron Catalysts for the Direct Hydrogenation of CO2 to Short Chain Olefins," ACS Catal., 2018, 8:9174-9182.

(56) References Cited

OTHER PUBLICATIONS

Russkikh et al., "Red mud as an efficient catalyst in turning CO2 hydrogenation," Chemical Science Seminar, Oct. 13, 2019; KAUST, 2019, 1 page, Abstract only.

Shop.pall.com (online), "Black Powder Filter," retrieved from URL <https://shop.pall.com/us/en/search?SearchTerm-black+powder+filter&resetsearch=true>, retrieved on Jun. 16, 2020, available on or before 2020, 7 pages.

Thach et al., "Further Improvements in Isomerization of Olefins in Solvent-free conditions," Journal of Synthetic Communications, Nov. 1992, pp. 1379-1384, Abstract only.

Van Beurden, "On the Catalytic Aspects of Stream-Methane Reforming: A Literature Survey," ECN-I--04-003, retrieved from URL <https://publicaties.ecn.nl/PdfFetch.aspx?nr=ECN-I--04-003>, Dec. 2004, 27 pages.

Visconti et al., "CO2 Hydrogentation to Lower Olefins on a High Surface Area K-Promoted Bulk FE-Catalyst," Appl. Catal., B 2017, 200, 530-542, 44 pages.

Wahyudi et al., "Utilization of Modified Red Mud as a Heterogeneous Base Catalyst for A26Transesterification of Canola Oil," Journal of Chemical Engineering of Japan, 2017, 50(7): 561-567.

Wang et al., "Fe—Cu Bimetallic Catalysts for Selective CO2 Hydrogenation to Olefin-rich C2+ Hydrocarbons," Ind. Eng. Chem. Res., Feb. 2018, 57(13): 4535-4542.

Wei et al., "New insights into the effect of sodium on Fe3O4-based nanocatalysts for CO2 hydrogenation to light olefins," Catal. Sci. Technol., 2016, 6(13): 4786-4793.

Yensen et al., "Open source all-iron battery for renewable energy storage," HardwareX 6 (2019) e00072, 2019, 11 pages.

You et al., "Hydrogenation of carbon dioxide to light olefins over non-supported iron catalyst," Chin. J. Catal., May 2013, 34(5): 956-963.

PCT International Search Report and Written Opinion in International Appln. No. PCT/US2021/036855, dated Sep. 27, 2021, 14 pages.

\* cited by examiner

TANDEM ELECTROLYSIS CELL

TECHNICAL FIELD

This disclosure relates to electrolysis cells for fuel production.

BACKGROUND

The trends towards the use of hydrogen as a fuel, increasing the importance of identifying alternative hydrogen producing feedstocks. One of the potential feedstocks is water through electrolysis. However, the electrolysis of water is an energy intensive process and uses water with high ionic concentrations, depending on the electrolysis products. The use of renewable energy is one solution for the energy demands, as electrolysis provides a valuable technique for storing energy.

Further, the use of seawater for the electrolysis would provide abundant feedstock. However, seawater poses various technical difficulties, including high TDS (Total Dissolved Salts), membrane clogging, precipitate formation, corrosion, and energy requirements, among others.

SUMMARY

An embodiment described herein provides a tandem electrolysis cell. The tandem electrolysis cell includes a common enclosure that has two chambers. A first chamber is separated from a second chamber by a cation selective membrane. A common anode and a first cathode (cathode A) are disposed in the first chamber. The first cathode and the common anode are configured to electrolyze a saline solution to hydrogen and oxygen. A second cathode (cathode B) is disposed in the second chamber. The second cathode and the common anode are configured to electrolyze a brine solution in the first chamber to form chlorine and water in the second chamber to form hydrogen and hydroxide ions.

Another embodiment described herein provides a system for electrolyzing seawater. The system includes a tandem electrolysis cell. The tandem electrolysis cell includes a common enclosure that two chambers, wherein a first chamber is separated from a second chamber by a cation selective membrane. A common anode and a first cathode (cathode A) are disposed in the first chamber, wherein the first cathode and the common anode are configured to electrolyze a saline solution to hydrogen and oxygen in a first electrolysis reaction. A second cathode (cathode B) is disposed in the second chamber, wherein the second cathode and the common anode are configured to electrolyze a brine solution in the first chamber to form chlorine and water in the second chamber to form hydrogen and hydroxide ions in a second electrolysis reaction. The system includes an atmospheric water producer. The atmospheric water producer includes a solar panel to generate electricity and a battery to store the electricity, wherein the battery powers the tandem electrolysis cell. The atmospheric water producer includes a cooling system powered by the battery, wherein the cooling system harvests atmospheric moisture. The atmospheric water producer includes a water storage tank to collect the harvested atmospheric moisture, wherein the water storage tank provides the water to the second chamber.

Another embodiment described herein provides a method for using a tandem electrolysis cell (TEC) to form hydrogen, oxygen, chlorine, and sodium hydroxide. The method includes determining if a sodium ion concentration in a first chamber of the TEC is below a sodium ion threshold, and, while the sodium ion concentration remains below the sodium ion threshold, iteratively flowing saline water into a half-cell of a first chamber including a first cathode (cathode A); forming hydrogen at cathode A and oxygen at a common anode; and monitoring the sodium ion concentration in the first chamber. The method includes determining if a pH in a second chamber of the TEC is below a pH threshold, and, while the pH remains below the pH threshold, iteratively: flowing fresh water into a half-cell of a second chamber including a second cathode (cathode B); forming hydrogen and hydroxide ions at cathode B and oxygen at the common anode; and monitoring the pH in the first chamber.

DETAILED DESCRIPTION

Embodiments described herein provide a tandem electrolysis cell that produces hydrogen, chlorine gas, and sodium hydroxide from saline water, such as seawater. An integrated system includes the tandem electrolysis cell and a device to harvest atmospheric moisture to produce fresh water for use in the tandem electrolysis cell. The tandem electrolysis cell includes a single enclosure having two chambers, which hold three electrodes, including a first cathode (A), a second cathode (B) and a common anode. Cathode A and the common anode are in a first chamber, separated by a partial barrier extending below the electrodes to prevent mixing of the gases formed. Cathode B is in a separate chamber that is separated from the common anode by a sodium permeable membrane. The structure of the tandem electrolysis cell is discussed further with respect to FIG. 1.

The proposed configuration operates in two stages by initially reducing alkalized saline water in the first chamber to produce hydrogen gas at cathode A. Simultaneously, oxygen is being produced at the common anode. This stage continues till the concentration of Na in the first chamber exceeds the desired sodium ion threshold of the sodium permeable membrane. In various embodiments, the threshold limit is about 100,000 ppm, or about 70,000 ppm, or about 50,000 ppm. Above the threshold limit, sodium ions permeate from the first chamber to the second chamber in sufficient amounts to support the electrolysis in the second chamber. Upon reaching equilibrium, the second stage begins by activating Cathode B in the second chamber to produce hydrogen, while the common anode will oxidize chloride ions to chlorine gas in the first chamber. The NaOH formed in the second chamber is pumped to an alkaline storage tank attached to the first chamber, for example, by flushing the second chamber with a fresh water being generated from the atmospheric moisture harvester device. The stages are discussed in more detail with respect to FIGS. 2A and 2B.

Figure 1:
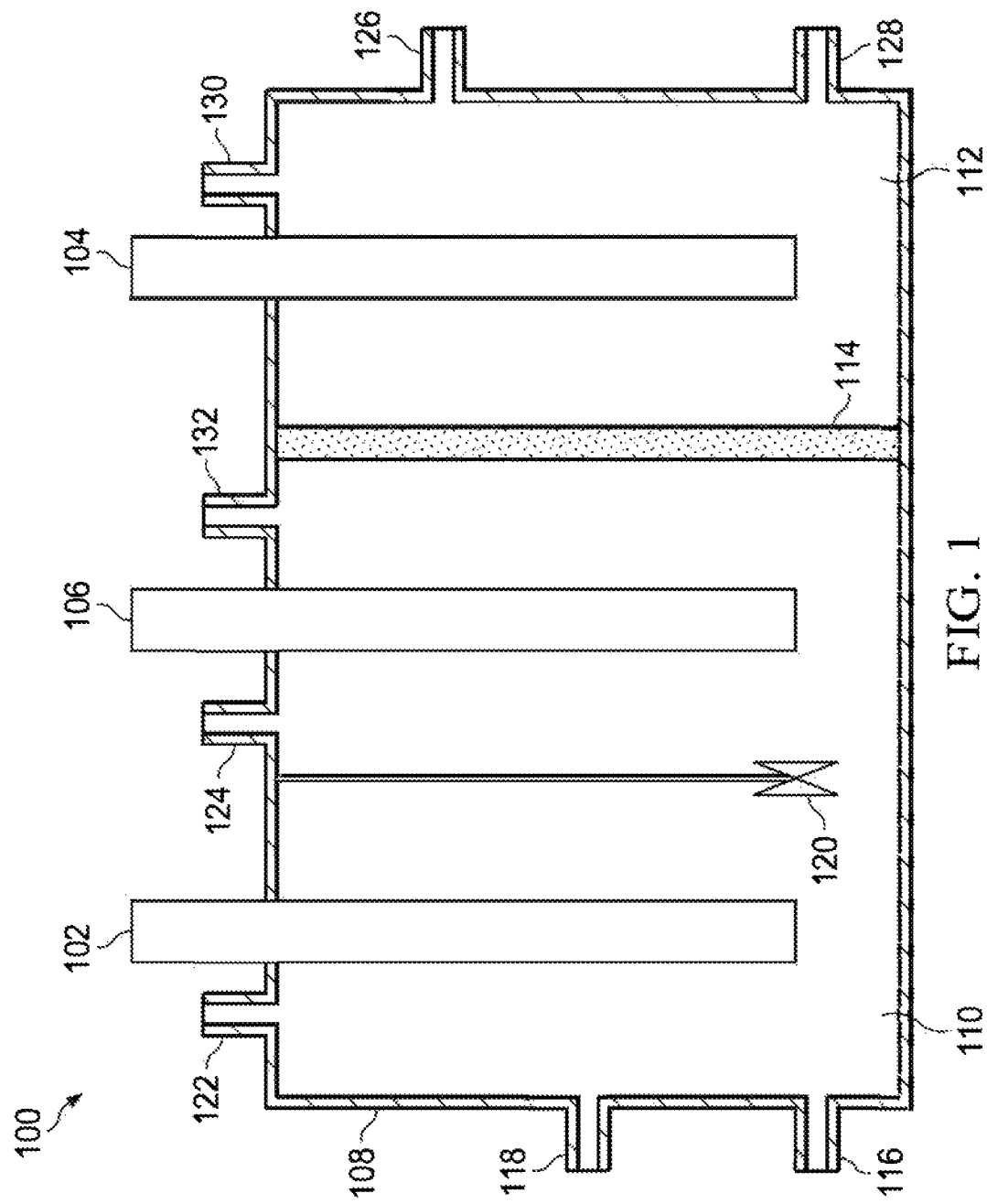
FIG. 1 is a drawing of a tandem electrolysis cell (TEC) having two cathodes (A and B) and a common anode.

FIG. 1 is a drawing of a tandem electrolysis cell (TEC) 100 having two cathodes 102 and 104 (A and B) and a common anode 106 that is shared. The TEC 100 is formed in a single enclosure 108. In some embodiments, the enclosure 108 has a corrosion resistant inner surface to resist corrosion from the oxygen and chlorine formed in the enclosure. In some embodiments, the container 108 is a steel vessel that has been coated with a corrosion resistant layer. In some embodiments, the corrosion resistant layer is glass. In some embodiments, the container 108 is a ceramic vessel.

The cathodes 102 and 104 are exposed to different environments, and can be made from the same or different materials. As cathode A 102 is in a saline environment, materials resistant to corrosion in the environment would provide longer operation. In some embodiments, cathode A is made from carbon with a surface impregnated with a catalytic metal, such as platinum or other noble metal. In some embodiments, cathode A 102 is made from a platinum mesh. In some embodiments, cathode A is made from a catalytic metal oxide, such as alumina, titania, or silica, among others, that is impregnated with one or more metals for conductivity and catalysis.

Cathode B 104 is in a less corrosive environment, and, thus, can be made from lower cost materials. In some embodiments, cathode B 104 is made from Rainey nickel. As used herein, a Rainey nickel electrode may be formed by etching aluminum from an aluminum nickel alloy, forming a porous nickel mesh. In some embodiments, cathode B 104 is a stainless steel electrode.

The common anode 106 is exposed to a more corrosive environment than either cathode A 102 or cathode B 104 as oxygen gas or chlorine gas is formed at the common anode 106. Accordingly, the selection of material for the common anode 106 is limited by the corrosivity of this environment. In some embodiments, the common anode 106 is made from carbon with a surface impregnated with catalytic metal. In some embodiments, the common anode 106 is a platinum mesh.

The container 108 is divided into two chambers 110 and 112 by a cation selective membrane, such as a sodium permeable membrane 114. The sodium permeable membrane 114 allows the transport of sodium ions from the first chamber 110 to the second chamber 112. In some embodiments, the sodium permeable membrane 114 includes a polymer, such as sulfonated tetrafluoroethylene, available as the Nafion® product line from DuPont de Nemours, Inc., of Wilmington, Del., USA. In some embodiments, the sodium permeable membrane 114 includes polyvinylidene fluoride copolymers.

The first chamber 110 is an electrolysis cell for the formation of hydrogen and oxygen from a saline solution. During operation, the saline solution, such as seawater, is introduced into the first chamber 110 through a saline port 116. An alkali solution may be introduced into the first chamber 110 through an alkali addition port 118. A gas barrier 120 separates cathode A 102 from the anode 106, preventing gas formed at each electrode from mixing. A hydrogen port 122 is located proximate to the cathode A 102 to remove hydrogen formed at the cathode A 102. And oxygen port 124 is located proximate to the anode 106 to remove oxygen formed at the anode.

The second chamber 112 is an electrolysis half-cell for the formation of hydrogen from freshwater. During the operation of the second chamber 112, freshwater is introduced into the second chamber 112 through a water port 126. Sodium ions pass through the sodium permeable membrane 114. As the water is electrolytes to form hydrogen, hydroxide ions are also formed. A sodium hydroxide solution exits the second chamber 112 to an alkali removal port 128. The hydrogen formed in the second chamber 112 exits through a second hydrogen port 130. Chlorine is formed at the anode 106, and exits the first chamber 110 through a chlorine removal port 132.

The two chambers 110 and 112 operate at different stages of the process. While the first chamber 110 is operational for the formation of hydrogen and oxygen, the ports 126, 128, 130, and 132 are closed, for example, with an electrically actuated valve. While the second chamber 112, and the anode in the first chamber 110, are functioning to form hydrogen and chlorine, the ports 116, 118, 122, and 124 are closed. This is discussed further with respect to FIGS. 2A and 2B.

Figure 2A:
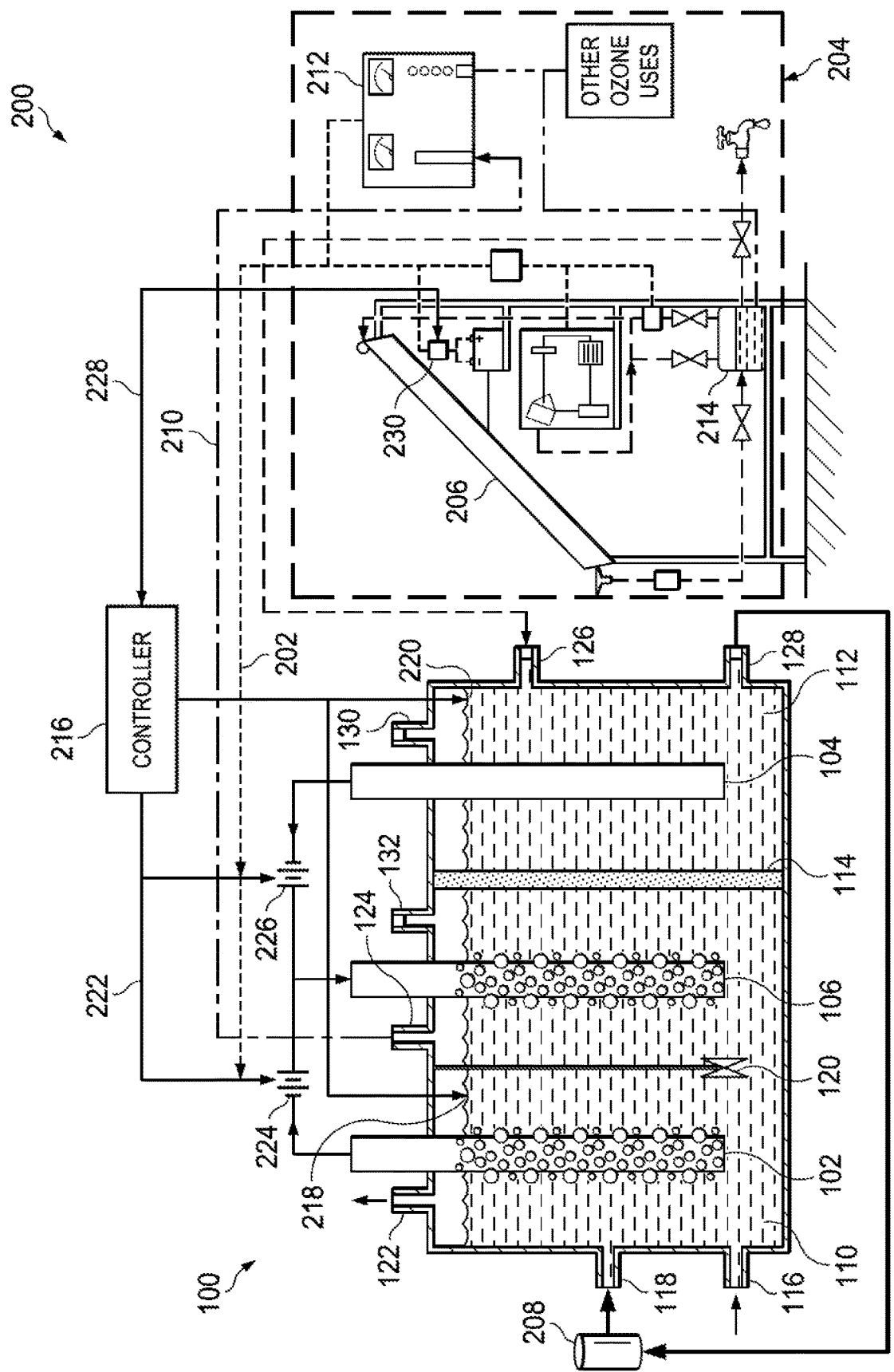
FIG. 2A is a schematic drawing of an integrated electrolysis system using the TEC showing the production of hydrogen and oxygen from seawater using the first cathode (A) with the anode.

FIG. 2A is a schematic drawing of an integrated electrolysis system 200 using the TEC 100 showing the production of hydrogen and oxygen from the electrolysis of seawater using cathode A 102 with the anode 106. The electrodes 102 and 106 are connected to an external power supply through power lines 202. The external power may be supplied by a grid, a solar source, or any other type of energy source. In some embodiments, the power is provided by an atmospheric water producer 204, which includes a solar panel 206 to generate electricity. The atmospheric water producer is described further with respect to FIG. 3.

At a certain voltage, termed the critical voltage, between both electrodes, the electrodes start to produce hydrogen gas at the negative electrode, cathode A 102 and oxygen gas at the positively based electrode, the anode 106. The amount of gases produced per unit time is directly related to the current that passes through the electrolysis cell.

The pH is maintained at a high level, for example, above 8, 10, or above 12, by the addition of NaOH through the alkali port 118 from a NaOH tank 208, forcing oxygen production The electrolysis half reactions taking place between cathode A 102 and the anode 106 are:

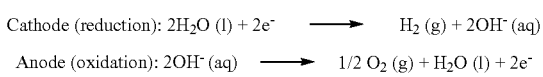

Combining the half reaction pair yields the overall decomposition of water into oxygen and hydrogen:

The oxygen that exits the first chamber through the oxygen removal port 124. In some embodiments, the oxygen is conveyed by an oxygen line 210 to an ozone generator 212, which uses electricity from the solar panel 206 to generate ozone, for example, used to prevent microbial growth in a water storage tank 214.

The hydrogen exits the first chamber 110 through the hydrogen removal port 122. The hydrogen can then be collected and provided as a fuel for other devices or a feedstock for other processes. As water is being dissociated through electrolysis, over time, the concentration of NaCl in the first chamber 112 will increase and exceed the desired threshold limit of the sodium permeable membrane 114 that function as a barrier between the first chamber 110 and the second chamber 112.

In some embodiments, a controller 216 monitors parameters in each of the chambers 110 and 112 through sensors 218 and 220. Sensors 218 in the first chamber 110 may be used to monitor liquid level in the first chamber 110, the concentration of sodium ions. In these embodiments, when the concentration reaches a predetermined threshold level, such as 70,000 ppm, or higher, control lines 222 are used to switch off the first power supply 224 to cathode A 102 and switch on the second power supply 226, providing power to cathode B 104. In some embodiments, the first power supply 224 and the second power supply 226 are batteries charged from the solar cell 206 of the atmospheric water producer 204, allowing hydrogen production to continue for at least some period of time when energy is not being produced by the solar panel 206.

In some embodiments, the controller 216 activates valves (not shown) to close ports 122, 124, 116, and 118 after switching off the first power supply 224. In this embodiment, the controller 216 then activates valves (not shown) to open ports 126, 128, 130, and 132 prior to switching on the second power supply 226.

In some embodiments, the controller 216 communicates through communication lines 228, such as a universal serial bus (USB), with a control panel 230 in the atmospheric water producer 204. This allows the entry of control parameters into the controller 216, such as the concentrations at which to switch from the half-cell utilizing cathode A 102 to the half-cell cathode B 104.

The integrated electrolysis system 200 is not limited to the use of a controller 216 monitoring sensors 218 and 222 determine when to switch between half-cells. In some embodiments, a timer, for example, in the control panel 230, determines how long each half-cell should be running before switching to the other half-cell.

Figure 2B:
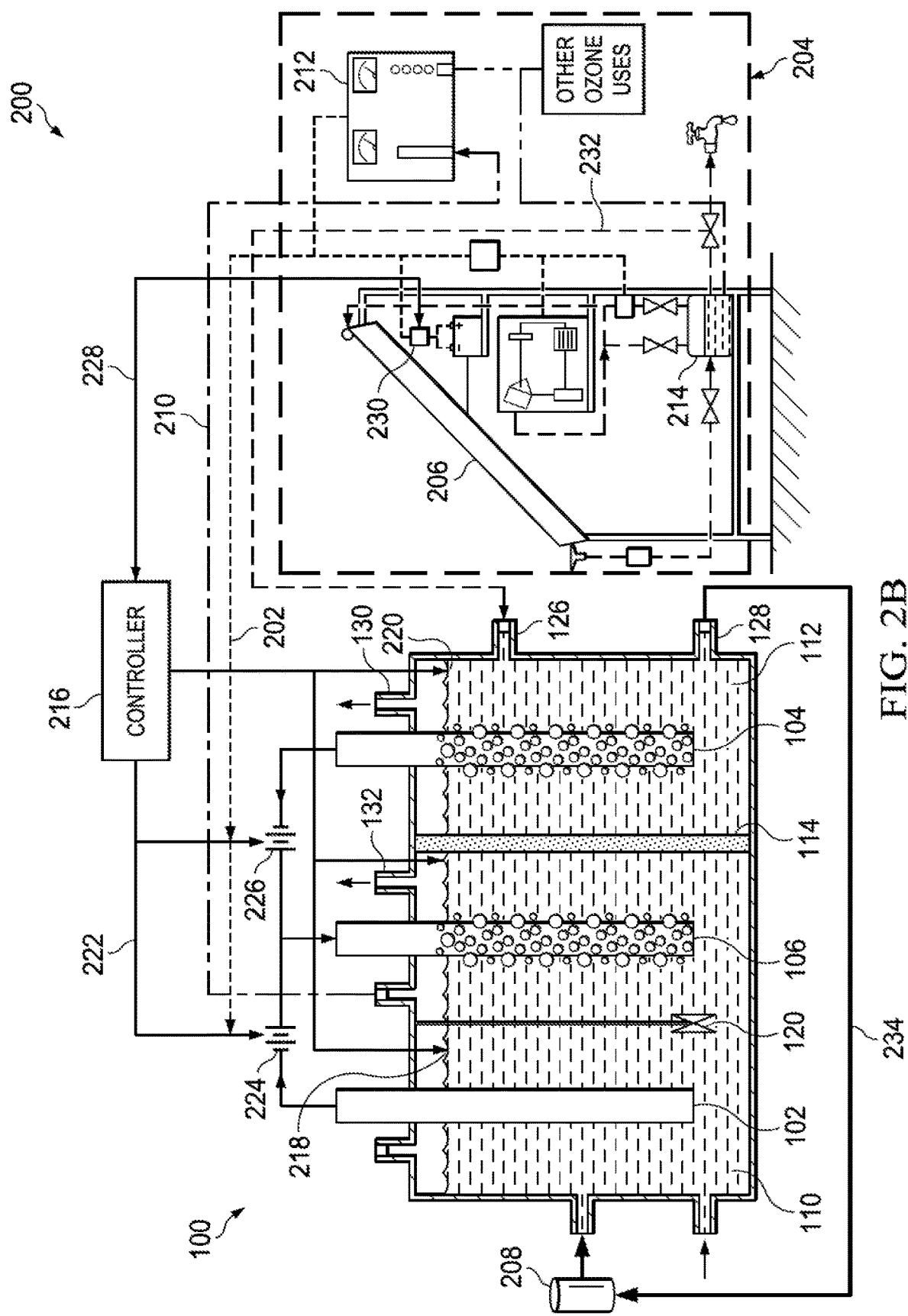
FIG. 2B is a schematic drawing of an integrated electrolysis system showing the production of hydrogen and chlorine from brine using the second cathode (B) with the anode.

FIG. 2B is a schematic drawing of the integrated electrolysis system 200 showing the production of hydrogen and chlorine from the electrolysis of brine using the second cathode B 104 with the anode 106. As described herein, Cathode B 104 and the anode 106 are in chambers 110 and 112 that are separated by the sodium selective membrane 114. The first chamber 110 contains a saturated brine solution generated by the operation of the first half-cell.

The water contained in the second chamber 112 is provided from the atmospheric water producer 204 through a water supply line 232, and fed to the second chamber through the water port 126. The amount of water provided to the second chamber 112 is controlled to maintain the ionic concentration used for conductivity. To allow for conductivity in the solution in the second chamber 112, a sodium chloride concentration is maintained in a range of about 180 g/L to about 200 g/L with a pH of about 1 to about 4.5.

During operation of the second half-cell, chloride ions are converted to chlorine at the anode 106. The chlorine exits the first chamber 110 though the chlorine removal port 132. Hydrogen is generated at cathode B 104 and exits the second chamber through the hydrogen removal port 130. As the hydrogen is formed from the water, hydroxyl ions are formed. To maintain charge balance, sodium ions migrate through the sodium permeable membrane 114 from the first chamber 110 to the second chamber 112. The sodium ions and hydroxyl ions form a sodium hydroxide solution that is removed from the second chamber through the alkali removal port 128. This solution is carried through an alkali line 234 to the sodium hydroxide storage tank 208 for use during operation of the first half-cell.

In the saturated brine, the chloride ions are oxidized at the anode 106 losing electrons to become chlorine gas and the water molecules are reduced at cathode B 104 forming hydrogen gas. The electrolysis half reaction taking place between cathode B 104 and the anode 106 are:

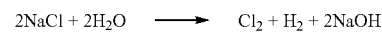

Combining the half reaction pair gives the overall reaction for the electrolysis of the brine into chlorine and hydrogen:

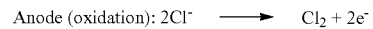
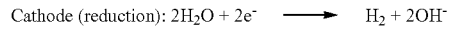

In some embodiments, the controller 216 monitors the parameters each of the chambers 110 and 112 through the sensors 218 and 220. For example, in some embodiments, when the pH or salt concentration in the second chamber 112 approaches the limits described above, the controller 216 switches off the second power supply 226 and closes valves on ports 126, 128, 130, and 132. The controller 216 then opens valves on ports 116, 118, 122, and 124 and switches on the first power supply 224 to return the operation to the first stage, described with respect to FIG. 2A.

In some embodiments, no valves are used on the ports. In these embodiments, the placement of reservoirs, such as the sodium hydroxide storage tank 208, the water storage tank 214, and a seawater tank (not shown) is used to drive the flow of the solutions instead. For example, the seawater tank and the sodium hydroxide storage tank 208 may be placed at the same level as the TEC 100. As electrolysis of the seawater in the first chamber 110 lowers the level of the liquid in the first chamber 110, liquids from the seawater tank and the sodium hydroxide storage tank 208 will then flow into the first chamber 110.

Similarly, as the level of the liquid in the second chamber 112 drops during hydrolysis, liquid from the reservoirs may be pulled into the second chamber 112. In this example, a water pump may be used to drive the flow of the sodium hydroxide from the second chamber 112 by pumping freshwater into the second chamber 112.

Figure 3:
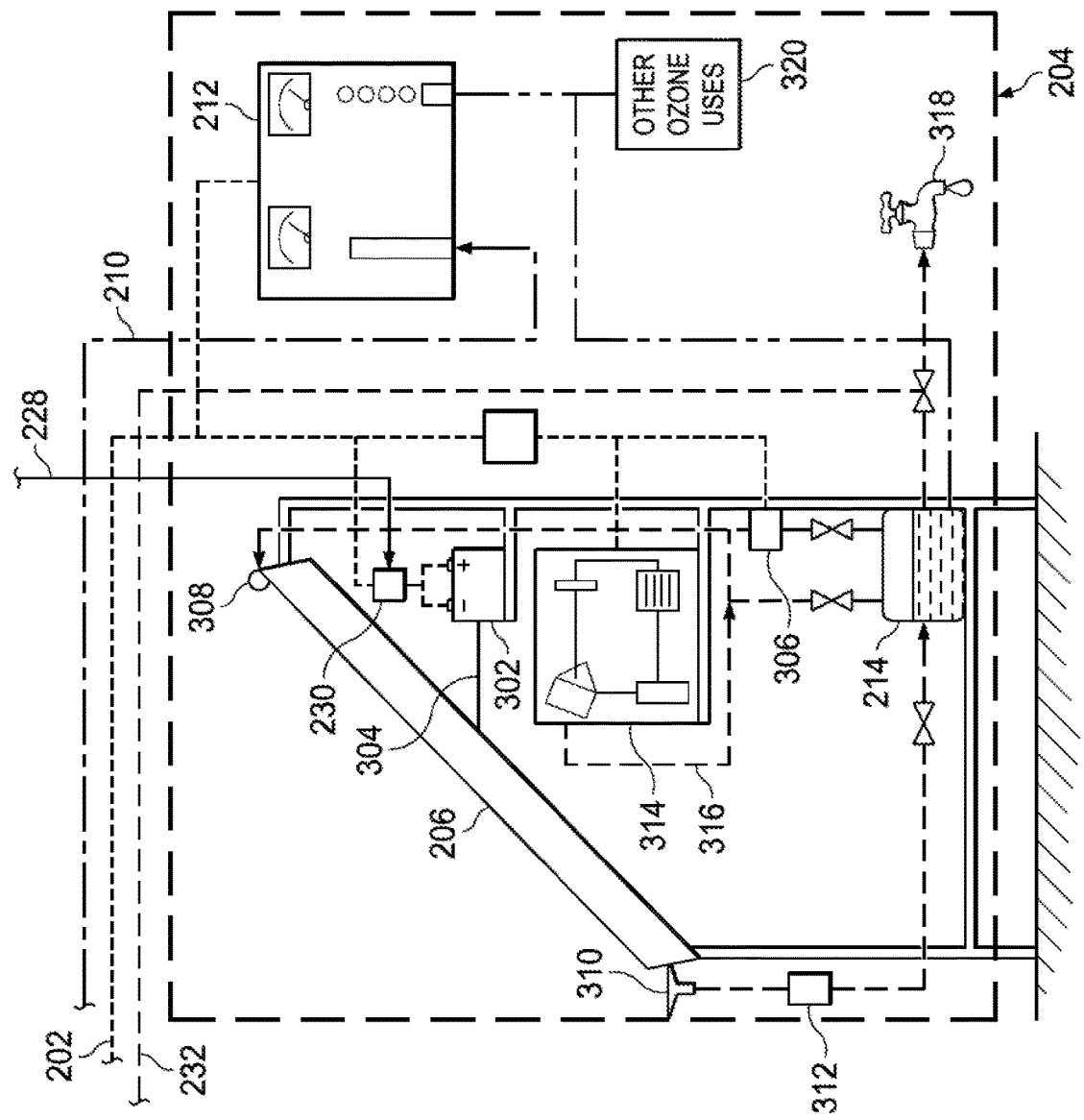
FIG. 3 is a drawing of an atmospheric water generation system that can be used in the integrated electrolysis system.

FIG. 3 is a drawing of an atmospheric water producer 204 that can be used in the integrated electrolysis system 200. Like numbered items are as described with respect to FIGS. 1, 2A, and 2B. In the atmospheric water producer 204 the solar cell 206 charges a battery 302 through a power line 304, which is used to provide power to the system and to the TEC 100 during at least a portion of the periods when the solar cell 206 is not producing power, such as at night.

As the atmospheric water producer 204 may be used in environments that have a significant amount of particulates, a cleaning system may be included to keep the solar cell 206 clean. In some embodiments, the cleaning system may include a pump 306 used to draw water from the water storage tank 214 and provide the water to a nozzle 308 that sprays the water over the front of the solar panel 206. A catch basin 310 at the bottom of the solar panel 206 captures the water, which is passed through a filter 312 to remove the particulates prior to the water being returned to the water storage tank 214.

The water is generated by a cooling system, such as refrigeration system 314. In some embodiments, the refrigeration system 314 includes standard refrigeration components, such as a compressor to compress a refrigerant gas, a condenser to condense the refrigerant gas to a liquid, and a heat exchanger that is cooled by allowing the liquid refrigerant to flash back to a gas. The expanding refrigerant in the heat exchanger condenses water from the atmosphere, which is conveyed by a water line 316 to the water storage tank 214. In some embodiments, a water tap 318 is included to allow water from the water storage tank 214 to be accessed for other purposes. Similarly, ozone from the ozone generator 212 may be tapped for other uses 320.

Although the atmospheric water producer 204 shown in the example of FIG. 3 uses a refrigeration system 314 as the cooling system to condense water from the atmosphere, other systems may be used. For example, in an embodiment, a compressor powered by the solar panel 206 compresses air which is stored in a compressed air tank. The compressed air is then released from a nozzle into a chamber behind the solar panel 206, cooling the solar panel by the expansion of the compressed air. This condenses water on the face of the solar panel 206 which is captured in the catch basin 310 and provided to the water storage tank 214.

Figure 4:
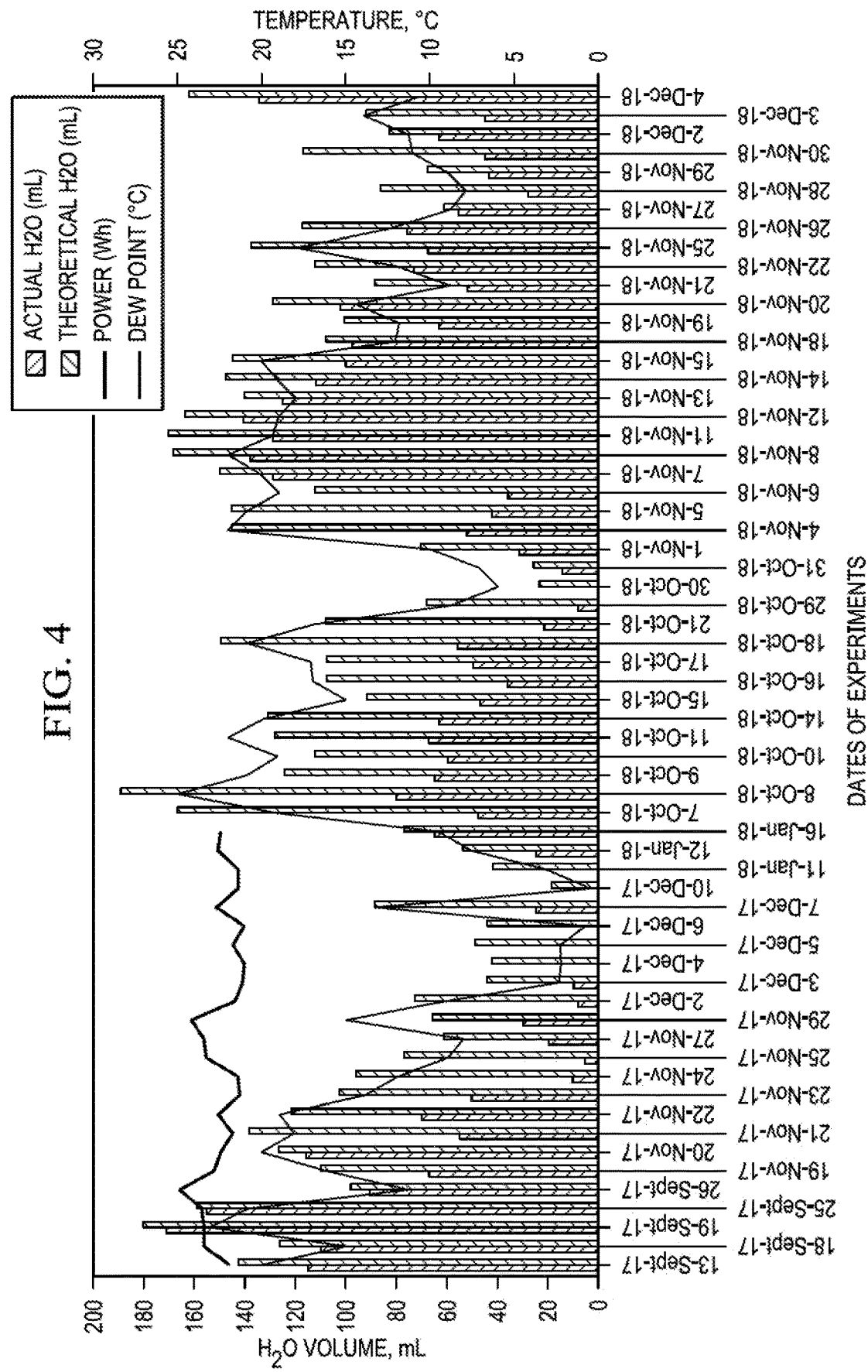
FIG. 4 is a plot of the amount of harvested moisture by the atmospheric water producer at the same time on calendar days.

FIG. 4 is a plot of the amount of harvested moisture by the atmospheric water producer 206 at the same time on calendar days. In addition to the amount of harvested moisture, the plot includes the dewpoint and power consumption. The plot shows that the efficiency of harvesting atmospheric moisture varies from about 5% to about 90%. This depends on the dewpoint and the condensation capacity of the atmospheric water producer 206. From this figure, it can be clearly seen that, generally, as the dew point increases the amount of harvested atmospheric moisture increases, so long as the condensation capacity does not drop, for example, due to refrigerant loss or other issues. The power consumption of the atmospheric water producer 206 system was measured to be in average around 150 watt per hour.

The quality of the harvested moisture was assessed by the measurement of different parameters that are listed in Table 1. From this table it can be clearly seen that the total dissolved solids (TDS) value is lower than seawater and some fresh water sources. Thus the harvested moisture can be used directly in the TEC without further treatment, lower energy costs.

which saline water is flowed into the cathode A half-cell, e.g., the first chamber. At block 504, power is supplied to cathode A and the anode, forming hydrogen at cathode A and oxygen at the anode.

At block 506, these sodium ion (Na+) concentration in the first chamber is monitored. At block 508, a determination is made as to whether the sodium ion concentration is above a threshold value, such as 70,000 ppm or higher. If the sodium ion concentration is not above the threshold value, process flow returns to block 502 and stage I of the process continues with the production of hydrogen at cathode A and oxygen at the anode.

If at block 508, the sodium ion concentration is above the threshold value, process flow moves to block 510 to begin stage II of the process. At block 510, freshwater is flowed into the cathode B half-cell of the second chamber. At block 512, power is supplied to cathode B and the anode, forming hydrogen at cathode B and chlorine at the anode. At block 514, a sodium hydroxide solution formed in the electrolysis in the cathode B half-cell is flowed out of the second chamber.

At block 516, the pH in the second chamber is monitored. At block 518, a determination is made as to whether the pH is below a threshold value, such as 8 or 9. If the pH is below the threshold value, process flow returns to block 510 and stage II of the process continues. If the pH is above a threshold value, or the sodium hydroxide concentration is above a threshold value, process flow returns to block 502 to restart stage I of the process.

As described above with respect to FIGS. 2A and 2B, valves may be closed by a controller as the stages change between the stage I and stage II of the process. Further, the cathode A half-cell is deenergized when the cathode B half-cell is energized, and vice versa. As described herein, in some embodiments, a timer may be used in place of the concentration sensors to simplify the equipment.

Figure 6:
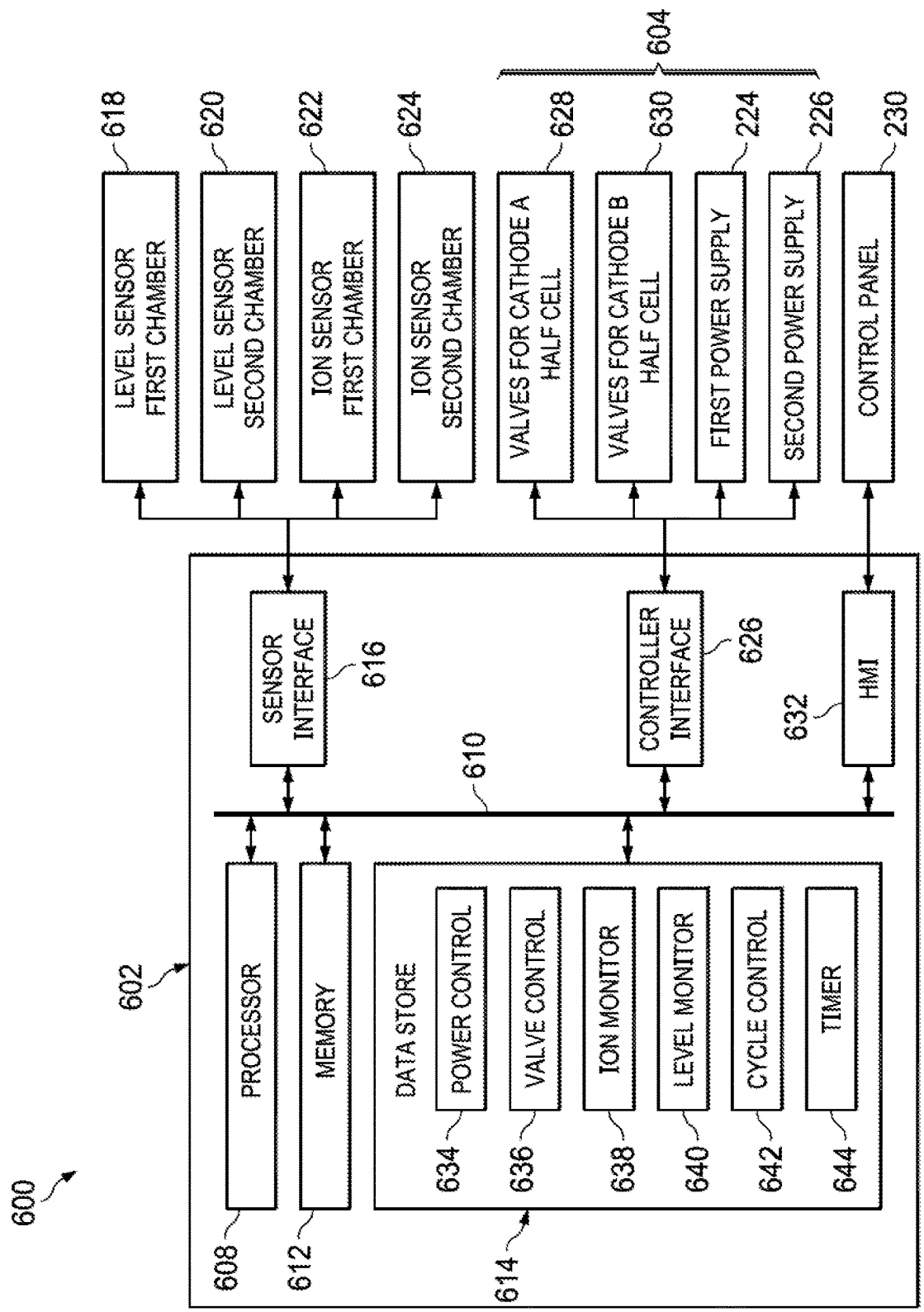
FIG. 6 is a block diagram of a controller that can be used to control the integrated electrolysis system.

FIG. 6 is a block diagram of a system 600 that may be used for controlling a TEC. Like numbered items are as described with respect to FIGS. 2A and 2B. The system 600 includes a controller 602, sensors/actuators 604, and a control panel 606. In some embodiments, controller 602 is a microcontroller, for example, mounted in the enclosure with the control panel 606. In other embodiments, the controller 602 is a virtual controller running on a processor in a DCS, on a virtual processor in a cloud server, or using other real or virtual processors.

The controller 602 includes a processor 608. The processor 608 may be a microprocessor, a multi-core processor, a multithreaded processor, an ultra-low-voltage processor, an embedded processor, or a virtual processor. In some embodiments, the processor 608 may be part of a system-on-a-chip (SoC) in which the processor 608 and the other components of the controller 602 are formed into a single integrated

TABLE 1

| Quality of Harvested Atmospheric Moisture | | | | | | | | | | | |
|---|---|---|---|---|---|---|---|---|---|---|---|
| Parameters | $HCO_3^{-1}$ | $OH^{-1}$ | $Cl^{-1}$ | $CO_3^{-2}$ | $SO_4^{-2}$ | $CA^{+2}$ | $Na^{+1}$ | $K^{+1}$ | $Mg^{+2}$ | pH | TDS |
| Minimum | 15 | 0 | <1 | 0 | <1 | 4 | 1 | 10 | <1 | 5.1 | 39 |
| Maximum | 41 | 0 | 4 | 0 | 4 | 25 | 19 | 11 | 6 | 8.1 | 103 |

Figure 5:
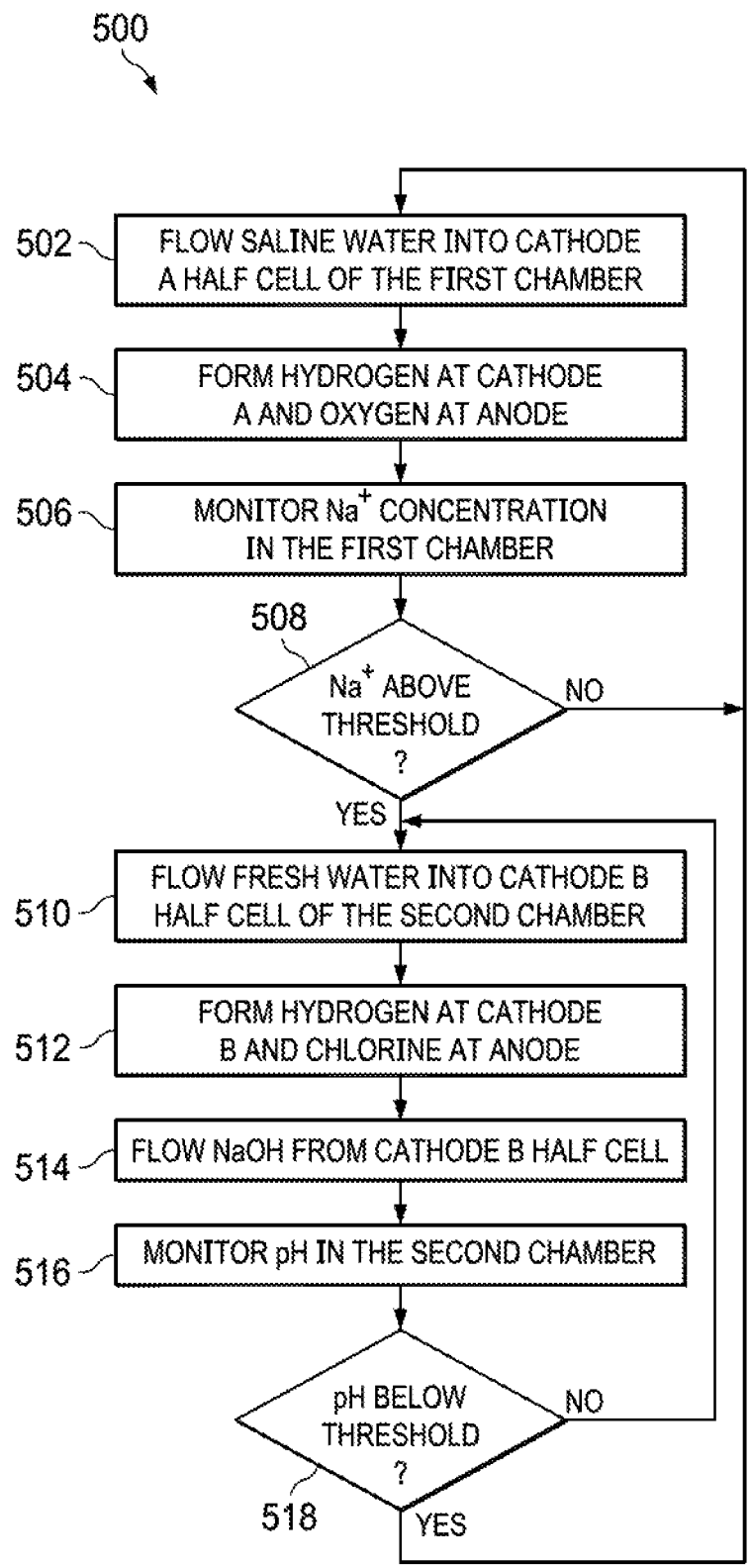
FIG. 5 is a process flow diagram of a method for using the tandem electrolysis cell to generate hydrogen and oxygen in a first portion of the cycle and hydrogen and chlorine in a second portion of the cycle.

FIG. 5 is a process flow diagram of a method 500 for using the TEC to generate hydrogen and oxygen in a first portion of the cycle and hydrogen and chlorine in a second portion of the cycle. The method begins at block 502 at electronics package. In various embodiments, the processor 608 may include processors from Intel® Corporation of Santa Clara, Calif., from Advanced Micro Devices, Inc. (AMD) of Sunnyvale, Calif., or from ARM Holdings, LTD., Of Cambridge, England. Any number of other processors from other suppliers may also be used.

The processor 608 may communicate with other components of the controller 602 over a bus 610. The bus 610 may include any number of technologies, such as industry standard architecture (ISA), extended ISA (EISA), peripheral component interconnect (PCI), peripheral component interconnect extended (PCIx), PCI express (PCIe), or any number of other technologies. The bus 610 may be a proprietary bus, for example, used in an SoC based system. Other bus technologies may be used, in addition to, or instead of, the technologies above.

The bus 610 may couple the processor 608 to a memory 612. In some embodiments, such as in PLCs and other process control units, the memory 612 is integrated with a data store 614 used for long-term storage of programs and data. The memory 612 include any number of volatile and nonvolatile memory devices, such as volatile random-access memory (RAM), static random-access memory (SRAM), flash memory, and the like. In smaller devices, such as PLCs, the memory 612 may include registers associated with the processor itself. The data store 614 is used for the persistent storage of information, such as data, applications, operating systems, and so forth. The data store 614 may be a non-volatile RAM, a solid-state disk drive, or a flash drive, among others. In some embodiments, the data store 614 will include a hard disk drive, such as a micro hard disk drive, a regular hard disk drive, or an array of hard disk drives, for example, associated with a DCS or a cloud server.

The bus 610 couples the processor 608 to a sensor interface 616. The sensor interface 616 connects the controller 602 to the sensors used to monitor the electrolysis. In some embodiments, the sensor interface 616 is a bank of analog-to-digital converters (ADCs), an I2C bus, a serial peripheral interface (SPI) bus, or a Fieldbus®, and the like. In some embodiments, a level sensor in the first chamber 618 and a level sensor in the second chamber 620. The level sensors 618 and 620 may include conductivity sensors, optical sensors, or float sensors, among others. In some embodiments, the level sensors 618 and 620 are not used, for example, if placement of the liquid storage vessels is used to maintain levels in the chambers.

In some embodiments, the sensors include an ion sensor in the first chamber 622. In some embodiments, the ion sensor in the first chamber 622 is a sodium ion sensor, a pH sensor, an oxidation-reduction potential (ORP) sensor, or a chloride ion sensor, among others. In some embodiments, the sensors include an ion sensor in the second chamber 624. In some embodiments, the ion sensor in the second chamber 624 is a pH sensor, a sodium ion sensor, or a chloride ion sensor, among others. Combinations of the sensors may be used to monitor the electrolysis process.

The bus 610 couples the processor 608 to a control interface 626 is used to couple the controller 602 to controls used to operate the TEC. In some embodiments, the controller interface 626 is a bank of relays, a bank of MOSFET power controllers, a serial peripheral interface (SPI), or a Fieldbus, and the like. In some embodiments, the controls include valves on the ports for the cathode A half-cell 628, as described with respect to FIG. 2A. In some embodiments, the controls include valves on the ports for the cathode B half-cell 630, as described with respect to FIGS. 2A and 2B. In some embodiments, the valves are solenoid control valves, for example, that open when energized and close when deenergized. In some embodiments, the controls include a first power supply 224 for the cathode A half-cell and a second power supply 226 for the cathode B half-cell, as described with respect to FIGS. 2A and 2B.

The bus 610 couples the processor 608 to a human machine interface (HMI) 632. The HMI 632 couples the controller 602 to a control panel 230, as described with respect to FIGS. 2A and 2B. As discussed herein, in some embodiments, the controller 602 may be colocated with the control panel 230 in a single enclosure in the atmospheric water producer 214. In some embodiments, such as if a group or cluster of the TECs and atmospheric water producers is used, the controller 602 may be part of a distributed control system or control system that controls the entire group or cluster.

The data store 614 includes blocks of stored instructions that, when executed, direct the processor 608 to implement the functions of the controller 602. The data store 614 includes a block 634 of instructions to direct the processor to activate the power supplies 224 and 226. In various embodiments this is performed, for example, by activating a relay in the controller interface to activate a power supply, activating a MOSFET in the controller interface to activate a power supply, or sending instructions over a bus to a control unit on the power supply.

The data store 614 includes a block 636 of instructions to direct the processor to open or close valves for one of the half-cells. For example, the instructions may instruct the valves for the cathode A half-cell to open while instructing the valves for the cathode B half-cell to close. In various embodiments, this is performed by activating relays to energize solenoid valves for opening and deactivating relays to deenergize solenoids allowing valves to close.

The data store 614 also includes a block 638 of instructions to monitor the ionic concentrations in each of the chambers 110 and 112 (FIG. 1) using the ion sensors 622 and 624. In some embodiments, the monitoring is performed by determining a voltage level from an ion sensitive electrode, such as a sodium electrode, a pH electrode, and the like. The monitoring may be continuous, operating in the background, or may be performed for only the relevant operating half-cell.

The data store 614 includes a block 640 of instructions to direct the processor to monitor the levels in each of the chambers 110 and 112 using the level sensors 618 and 620. In some embodiments, the monitoring is performed by determining a voltage level from a conductivity sensor. In some embodiments, the monitoring is performed continuously to allow the controller 602 to interrupt the process if a level in a chamber 110 or 112 drops below a preset threshold, such as about 90%, about 80%, or lower.

The data store 614 includes a block 642 of instructions to direct the processor to implement the process control for the TEC. As described in detail with respect to FIG. 5, this block of instructions monitors the ionic concentrations in the operational half-cell, and switches to the other half-cell when the ionic concentrations reach operational thresholds. For example, when the threshold is reached, the block 642 of instructions will instruct the processor to shut off the operational power supply 224 or 226, and close the valves relevant to that half-cell 628 or 630, as described in detail with respect to FIGS. 2A and 2B. The instructions 642 will then instruct the processor to open the valves relevant to the next half-cell 630 or 628 and activate the power supply 226 or 224 to power that half-cell.

In this embodiment, the data store 614 also includes a block 644 of instructions to direct the processor to implement a timer for switching between the half-cells. In many installations, the TEC and atmospheric water producer may be in a field or remote location. Accordingly, in some embodiments, the block 644 of instructions monitor the operation of the equipment and, in event of a failure, such as of a sensor, moved to a timed sequence for switching between the half-cells. In some embodiments, the ion sensors 622 and 624 and the block 642 of instructions 642 to implement the cycle control are omitted, and the timer is used to switch back and forth between the half-cells on a precalculated timeframe. For example, the timer may switch between cells on a timeframe of about 10 minutes, about 20 minutes, about 30 minutes, or longer. Further, the timer may be used with a power monitor to determine the amount of electrolysis that has occurred to increase the timeframe if the insolation on the solar panel has decreased, lowering the amount of power available.

An embodiment described herein provides a tandem electrolysis cell. The tandem electrolysis cell includes a common enclosure that has two chambers. A first chamber is separated from a second chamber by a cation selective membrane. A common anode and a first cathode (cathode A) are disposed in the first chamber. The first cathode and the common anode are configured to electrolyze a saline solution to hydrogen and oxygen. A second cathode (cathode B) is disposed in the second chamber. The second cathode and the common anode are configured to electrolyze a brine solution in the first chamber to form chlorine and water in the second chamber to form hydrogen and hydroxide ions.

In an aspect, the enclosure includes a corrosion resistant inner surface. In an aspect, the corrosion resistant inner surface is glass. In an aspect, the enclosure includes a ceramic.

In an aspect, the first chamber includes a gas barrier, wherein cathode A is on a first side of the gas barrier and the anode is on a second side of the gas barrier. The gas barrier extends below cathode A and the anode, and an opening below the gas barrier allows liquid flow between cathode A and the anode.

In an aspect, the tandem electrolysis cell includes a saline port proximate to cathode A on the first side of the gas barrier. In an aspect, the tandem electrolysis cell includes an alkali port proximate to cathode A on the first side of the gas barrier. In an aspect, the tandem electrolysis cell includes a hydrogen removal port proximate to cathode A on the first side of the gas barrier, wherein the hydrogen removal port is on a top surface of the enclosure.

In an aspect, the tandem electrolysis cell includes an oxygen removal port proximate to the anode on a second side of the gas barrier, wherein the oxygen removal port is on a top surface of the enclosure. In an aspect, the tandem electrolysis cell includes a chlorine removal port proximate to the anode on a second side of the gas barrier, wherein the chlorine removal port is on a top surface of the enclosure.

In an aspect, the cation selective membrane is a sodium permeable membrane. In an aspect, the sodium permeable membrane includes sulfonated tetrafluoroethylene or polyvinylidene fluoride copolymers or both.

In an aspect, the tandem electrolysis cell includes a water port on the second chamber. In an aspect, the tandem electrolysis cell includes an alkali removal port on the second chamber. In an aspect, the tandem electrolysis cell includes a hydrogen removal port on the second chamber.

Another embodiment described herein provides a system for electrolyzing seawater. The system includes a tandem electrolysis cell. The tandem electrolysis cell includes a common enclosure that two chambers, wherein a first chamber is separated from a second chamber by a cation selective membrane. A common anode and a first cathode (cathode A) are disposed in the first chamber, wherein the first cathode and the common anode are configured to electrolyze a saline solution to hydrogen and oxygen in a first electrolysis reaction. A second cathode (cathode B) is disposed in the second chamber, wherein the second cathode and the common anode are configured to electrolyze a brine solution in the first chamber to form chlorine and water in the second chamber to form hydrogen and hydroxide ions in a second electrolysis reaction. The system includes an atmospheric water producer. The atmospheric water producer includes a solar panel to generate electricity and a battery to store the electricity, wherein the battery powers the tandem electrolysis cell. The atmospheric water producer includes a cooling system powered by the battery, wherein the cooling system harvests atmospheric moisture. The atmospheric water producer includes a water storage tank to collect the harvested atmospheric moisture, wherein the water storage tank provides the water to the second chamber.

In an aspect, the system includes a sodium hydroxide storage tank to store sodium hydroxide produced during operation of the second chamber for use during operation of the first chamber. In an aspect, the system includes a first power supply to provide power to cathode A and the common anode. In an aspect, the system includes a second power supply to provide power to cathode B and the common anode.

In an aspect, the system includes an ion sensor in the first chamber. In an aspect, the ion sensor is a sodium electrode. In an aspect, the system includes an ion sensor in the second chamber. In an aspect, the ion sensor is a pH electrode. In an aspect, the system includes a level sensor in the first chamber, or a level sensor in the second chamber, or both.

In an aspect, the system includes a controller to control the tandem electrolysis cell, wherein the controller includes a processor and a data store. The data store includes instructions to direct the processor to determine if a sodium ion concentration in the first chamber is above a threshold, and, if so, turn off a first power supply providing power to cathode A and the common anode and turn on a second power supply to provide power to cathode B and the common anode. The data store includes instructions to direct the processor to determine if a pH in the second chamber is below a threshold, and, if so, turn off a second power supply providing power to cathode B and the common anode and turn on a first power supply to provide power to cathode A and the common anode.

In an aspect, the data store includes instructions to direct the processor to close valves for the first electrolysis reaction after turning off the first power supply and open valves for the second electrolysis reaction prior to turning on the second power supply. In an aspect, the data store includes instructions to direct the processor to close valves for the second electrolysis reaction after turning off the second power supply and open valves for the first electrolysis reaction prior to turning on the first power supply.

Another embodiment described herein provides a method for using a tandem electrolysis cell (TEC) to form hydrogen, oxygen, chlorine, and sodium hydroxide. The method includes determining if a sodium ion concentration in a first chamber of the TEC is below a sodium ion threshold, and, while the sodium ion concentration remains below the sodium ion threshold, iteratively flowing saline water into a half-cell of a first chamber including a first cathode (cathode A); forming hydrogen at cathode A and oxygen at a common anode; and monitoring the sodium ion concentration in the first chamber. The method includes determining if a pH in a second chamber of the TEC is below a pH threshold, and, while the pH remains below the pH threshold, iteratively: flowing fresh water into a half-cell of a second chamber including a second cathode (cathode B); forming hydrogen and hydroxide ions at cathode B and oxygen at the common anode; and monitoring the pH in the first chamber.

In an aspect, when the sodium ion concentration exceeds the sodium ion threshold in the first chamber, a first power supply that supplies power to cathode A and the common anode is powered off, and a second power supplies that supplies power to cathode B and the common anode is powered on.

In an aspect, when the pH drops below a pH threshold in the second chamber, a second power supply that supplies power to cathode B and the common anode is powered off, and a first power supplies that supplies power to cathode A and the common anode is powered on.

Other implementations are also within the scope of the following claims.

What is claimed is:

1. A tandem electrolysis cell, comprising:
   a common enclosure comprising two chambers, wherein a first chamber is separated from a second chamber by a cation selective membrane;
   a common anode disposed in the first chamber, wherein the common anode is operated continuously;
   a first cathode (cathode A) disposed in the first chamber, wherein the first cathode and the common anode are configured to electrolyze a saline solution to hydrogen and oxygen, during a first stage of operation;
   a second cathode (cathode B) disposed in the second chamber, wherein the second cathode and the common anode are configured to electrolyze a brine solution in the first chamber to form chlorine and water in the second chamber to form hydrogen and hydroxide ions, during a second stage of operation;
   a controller to open valves, during the first stage of operation, and close valves, during the second stage of operation on:
     a saline inlet port on the first chamber;
     an alkali inlet port on the first chamber;
     a first hydrogen outlet port proximate to cathode A on the first chamber; and
     an oxygen outlet port proximate to the common anode on the first chamber, the oxygen outlet port being attached to the first chamber; and
   the controller to open valves, during the second stage of operation, and close valves, during the first stage of operation on:
     a water inlet port on the second chamber;
     an alkali outlet port on the second chamber;
     a second hydrogen outlet port on the second chamber; and
     a chlorine outlet port proximate to the common anode on the first chamber, the chlorine outlet port being attached to the first chamber,
   wherein the common anode is positioned between cathode A and cathode B, and between the oxygen outlet port and the chlorine outlet port.

2. The tandem electrolysis cell of claim 1, wherein the enclosure comprises a corrosion resistant inner surface.

3. The tandem electrolysis cell of claim 2, wherein the corrosion resistant inner surface is glass.

4. The tandem electrolysis cell of claim 1, wherein the enclosure comprises a ceramic.

5. The tandem electrolysis cell of claim 1, wherein the first chamber comprises a gas barrier, wherein cathode A is on a first side of the gas barrier and the common anode is on a second side of the gas barrier, wherein the gas barrier extends below cathode A and the common anode, and wherein an opening below the gas barrier allows liquid flow between cathode A and the common anode.

6. The tandem electrolysis cell of claim 5, wherein the saline inlet port is proximate to cathode A on the first side of the gas barrier.

7. The tandem electrolysis cell of claim 5, wherein the alkali inlet port is proximate to cathode A on the first side of the gas barrier.

8. The tandem electrolysis cell of claim 5, wherein the first hydrogen outlet port proximate to cathode A is on the first side of the gas barrier, wherein the first hydrogen outlet port is on a top surface of the enclosure.

9. The tandem electrolysis cell of claim 5, wherein the oxygen outlet port proximate to the common anode is on the second side of the gas barrier, wherein the oxygen outlet port is on a top surface of the enclosure.

10. The tandem electrolysis cell of claim 5, wherein the chlorine outlet port proximate to the common anode on the second side of the gas barrier, wherein the chlorine removal port is on a top surface of the enclosure.

11. The tandem electrolysis cell of claim 1, wherein the cation selective membrane is a sodium permeable membrane.

12. The tandem electrolysis cell of claim 11, wherein the sodium permeable membrane comprises sulfonated tetrafluoroethylene or polyvinylidene fluoride copolymers or both.

13. A system for electrolyzing seawater, comprising:
   a tandem electrolysis cell, comprising:
     a common enclosure comprising two chambers, wherein a first chamber is separated from a second chamber by a cation selective membrane;
     a common anode disposed in the first chamber, wherein the common anode is operated continuously;
     a first cathode (cathode A) disposed in the first chamber, wherein the first cathode and the common anode are configured to electrolyze a saline solution to hydrogen and oxygen in a first electrolysis reaction;
     a second cathode (cathode B) disposed in the second chamber, wherein the second cathode and the common anode are configured to electrolyze a brine solution in the first chamber to form chlorine and water in the second chamber to form hydrogen and hydroxide ions in a second electrolysis reaction, wherein the common anode is positioned between cathode A and cathode B;
     a controller to open valves, during the first electrolysis reaction, and close valves, during the second electrolysis on:
       a saline inlet port on the first chamber;
       an alkali inlet port on the first chamber;
       a first hydrogen outlet port proximate to cathode A on the first chamber; and
       an oxygen outlet port proximate to the common anode on the first chamber, the oxygen outlet port attached to in the first chamber; and
     the controller to open valves, during the second electrolysis reaction, and close valves, during the first electrolysis reaction on:
       a water inlet port on the second chamber;
       an alkali outlet port on the second chamber;
       a second hydrogen outlet port on the second chamber; and
       a chlorine outlet port proximate to the common anode on the first chamber, the chlorine outlet port attached to the first chamber, wherein the common anode is positioned between the oxygen outlet port and the chlorine outlet port; and an atmospheric water producer, wherein the atmospheric water producer comprises:
- a solar panel to generate electricity;
- a battery to store the electricity, wherein the battery powers the tandem electrolysis cell;
- a cooling system powered by the battery, wherein the cooling system harvests atmospheric moisture; and
- a water storage tank to collect the harvested atmospheric moisture, wherein the water storage tank provides the water to the second chamber.

14. The system of claim 13, comprising a sodium hydroxide storage tank to store sodium hydroxide produced during operation of the second chamber for use during operation of the first chamber, the sodium hydroxide storage tank being connected to the alkali inlet port on the first chamber.

15. The system of claim 13, comprising a first power supply to provide power to cathode A and the common anode.

16. The system of claim 15, comprising a second power supply to provide power to cathode B and the common anode.

17. The system of claim 13, comprising an ion sensor in the first chamber.

18. The system of claim 17, wherein the ion sensor is a sodium electrode.

19. The system of claim 13, comprising an ion sensor in the second chamber.

20. The system of claim 19, wherein the ion sensor is a pH electrode.

21. The system of claim 13, comprising a level sensor in the first chamber, or a level sensor in the second chamber, or both.

22. The system of claim 13, wherein the controller comprises a processor and a data store, wherein the data store comprises instructions to direct the processor to:
  determine if a sodium ion concentration in the first chamber is above a threshold, and, if so:
    turn off a first power supply providing power to cathode A and the common anode; and
    turn on a second power supply to provide power to cathode B and the common anode; and
  determine if a pH in the second chamber is below a threshold, and, if so:
    turn off a second power supply providing power to cathode B and the common anode; and
    turn on a first power supply to provide power to cathode A and the common anode.

23. The system of claim 22, wherein the data store comprises instructions to direct the processor to:
  close valves for the first electrolysis reaction after turning off the first power supply; and
  open valves for the second electrolysis reaction prior to turning on the second power supply.

24. The system of claim 22, wherein the data store comprises instructions to direct the processor to:
  close valves for the second electrolysis reaction after turning off the second power supply; and
  open valves for the first electrolysis reaction prior to turning on the first power supply.

25. A method for using a tandem electrolysis cell (TEC) to form hydrogen, oxygen, chlorine, and sodium hydroxide, comprising:

determining if a sodium ion concentration in a first chamber of the TEC is below a threshold,
  and, if so, opening valves on:
    a saline inlet port on the first chamber;
    an alkali inlet port on the first chamber;
    a first hydrogen outlet port proximate to a first cathode (cathode A) on the first chamber; and
    an oxygen outlet port proximate to a common anode on the first chamber, the oxygen outlet port being attached to the first chamber; and
  closing valves on:
    a water inlet port on a second chamber;
    an alkali outlet port on the second chamber;
    a second hydrogen outlet port on the second chamber; and
    a chlorine outlet port proximate to the common anode on the first chamber, the chlorine outlet port being attached to the first chamber; and
  while the sodium ion concentration remains below the threshold, iterating:
    flowing saline water into a half-cell of the first chamber comprising cathode A;
    forming hydrogen at cathode A and oxygen at the common anode; and
    monitoring the sodium ion concentration in the first chamber; and
determining if a pH in the second chamber of the TEC is below a threshold, and, if so,
  opening valves on:
    the water inlet port on the second chamber;
    the alkali outlet port on the second chamber;
    the second hydrogen outlet port on the second chamber; and
    the chlorine outlet port proximate to the common anode on the first chamber; and
  closing valves on:
    the saline inlet port on the first chamber;
    the alkali inlet port on the first chamber;
    the first hydrogen outlet port proximate to cathode A on the first chamber; and
    the oxygen outlet port proximate to the common anode on the first chamber; and
  while the pH remains below the threshold, iterating:
    flowing fresh water into a half-cell of a second chamber comprising a second cathode (cathode B);
    forming hydrogen and hydroxide ions at cathode B and oxygen at the common anode; and
    monitoring the pH in the first chamber,
  wherein the common anode is positioned between cathode A and cathode B, and between the oxygen outlet port and the chlorine outlet port.

26. The method of claim 25, comprising, when the sodium ion concentration exceeds the threshold in the first chamber:
  powering off a first power supply that supplies power to cathode A and the common anode; and
  powering on a second power supplies that supplies power to cathode B and the common anode.

27. The method of claim 25, comprising, when the pH drops below the threshold in the second chamber:
  powering off a second power supply that supplies power to cathode B and the common anode; and
  powering on a first power supplies that supplies power to cathode A and the common anode.

* * * * *